(12) United States Patent  
McFarland

(10) Patent No.: US 9,851,274 B2  
(45) Date of Patent: Dec. 26, 2017

(54) PORTABLE PRESSURE SWITCH CALIBRATION AND DIAGNOSTIC TOOL

(71) Applicant: Richard Dean McFarland, Cincinnati, OH (US)

(72) Inventor: Richard Dean McFarland, Cincinnati, OH (US)

(73) Assignee: Good Day Tools LLC, Villa Hills, KY (US)

( * ) Notice: Subject to any disclaimer, the term of this patent is extended or adjusted under 35 U.S.C. 154(b) by 0 days.

(21) Appl. No.: 15/464,467

(22) Filed: Mar. 21, 2017

(65) Prior Publication Data

US 2017/0191896 A1    Jul. 6, 2017

Related U.S. Application Data

(62) Division of application No. 14/175,188, filed on Feb. 7, 2014, now Pat. No. 9,640,344.

(51) Int. Cl.
*G01L 27/00* (2006.01)
*H01H 35/24* (2006.01)

(52) U.S. Cl.
CPC ........... *G01L 27/002* (2013.01); *H01H 35/24* (2013.01)

(58) Field of Classification Search
CPC ........... H01H 11/0062; H01H 35/2607; H01H 35/24; G01L 27/002
See application file for complete search history.

(56) References Cited

U.S. PATENT DOCUMENTS

| 4,621,984 A | * | 11/1986 | Fussell | F04B 35/04 417/234 |
| 4,658,829 A | * | 4/1987 | Wallace | A61B 5/02156 600/488 |
| 5,363,689 A | * | 11/1994 | Hoffmann | G01F 1/68 73/1.17 |
| 5,495,079 A | * | 2/1996 | Joyce | H01H 35/2614 200/81 R |
| 6,170,316 B1 | * | 1/2001 | Aldrich | G01R 31/2829 73/1.58 |
| 9,309,898 B2 | * | 4/2016 | Gnessin | F04F 1/00 |

* cited by examiner

*Primary Examiner* — Francis Gray

(74) *Attorney, Agent, or Firm* — Ronald J. Richter; Hasse & Nesbitt LLC

(57) ABSTRACT

An apparatus for calibration and testing of pressure switches which are used in residential and commercial HVAC systems. The apparatus can be used to test, set, or adjust a pressure switch or a pressure signal transducer to the manufacturer's specifications. The apparatus includes an exterior housing with an on/off switch and at least one vacuum inlet nozzle, and the inside of the housing includes an air compressor to which the amount of voltage supplied can be manually controlled. The air compressor typically operates from a battery power supply located within the housing. A pressure measuring device, such as a differential pressure gage, and a conductivity indicator are typically used in conjunction with the device to calibrate adjustable pressure switches and to test and diagnose faulty pressure switches. The apparatus can include the pressure measuring device and/or the conductivity indicator within its housing.

1 Claim, 14 Drawing Sheets

PORTABLE PRESSURE SWITCH CALIBRATION AND DIAGNOSTIC TOOL

CROSS-REFERENCE TO RELATED APPLICATIONS

This application is a divisional application of U.S. application Ser. No. 14/175,188 filed Feb. 7, 2014, the disclosure of which is incorporated herein by reference in its entirety.

FIELD OF THE INVENTION

The present invention relates generally to testing and calibration of pressure switches, and more particularly, to an improved portable, hand-held tool for calibrating and diagnosing problems with pressure switches associated with HVAC systems.

BACKGROUND OF THE INVENTION

A pressure switch is a mechanical device which converts a pressure change of a liquid or gas into an electrical function. The pressure change might be measured as pressure, vacuum, or differential between two pressure inputs. In every case, the pressure switch will employ a diaphragm, a piston, a signal transducer, or other pressure-responsive sensor which is coupled to the mechanical means of actuating a switch. Pressure switches fulfill a variety of monitoring and control applications, and they are employed in virtually every industry, from appliances to automobiles to computers. They are often used in pneumatic systems, such as air compressor pressure switches for furnaces or HVAC systems, as well as water pressure switches or oil pressure switches. Pressure switches are common components of high-efficiency heating systems as well as high-efficiency water heaters. Different manufactures make differing types of pressure switches, and each type is set according to the manufacturer's specifications.

Pressure switches activate electromechanical or solid-state switches upon reaching a specific pressure level. For example, "normally open" pressure switches are used to keep the system from operating should the pressure not be high enough or exceed the safety limit. For example, should a flue become partially plugged, the pressure in the exhaust will build up presenting a dangerous condition. Flue gases containing carbon monoxide will spill into the living space. The flames will become unstable and "float" or "spill" out of the heat exchanger creating a fire hazard. Under these conditions, the normally-open switch will not close and the furnace will not be able to run. As this example illustrates, if the pressure in a system becomes either too high or too low, depending on whether the switch is a positive pressure switch that measures positive pressures, or a negative pressure switch that measures negative (vacuum) pressures, the pressure-responsive sensor (e.g., a diaphragm within the switch) will be affected to the point where the pressure switch will not complete the circuit, such that the power to the system controls is lost and the system does not run. In contrast, "normally closed" switches can also be used to verify that it is safe for the furnace to come on. If the switch had failed and it was stuck open, then the furnace would not come on.

Dual, or differential, pressure switches have a normally closed and a normally open circuit. The normally closed circuit allows the furnace to safely initiate the sequence of operation resulting in a flame. Typically negative pressure is created by the expelling of the flue gases, and the normally open circuit will close. This allows the furnace to continue operating safely because the flue gases are being expelled. Most differential pressure switches have two hoses connected. The first hose is located at the vacuum side of the switch and is connected to the flue circuit (the flue circuit expels the burned gases). The second hose is located at the positive pressure side of the switch and is connected to the gas valve (the gas circuit mixes air with the gas creating the flame). Generally, there should be little or no positive pressure. Should a positive pressure exist, it is typically an indication that the primary or secondary heat exchanger is becoming plugged. As a result, pressure build up creates a positive pressure which will negate from the negative or vacuum pressure, thus causing the negative (vacuum) pressure to drop below the setting and shut the furnace down. Dual pressure switches are also used to set the gas pressure of the gas valve in high efficiency units. When the gas ignites there is a slight variance in the pressures measured by a manometer. The gas pressure is then adjusted to the manufacturer's specifications.

Faulty pressure switches may be one of the most misdiagnosed problems in today's modern furnaces. Many pressure switches have been replaced needlessly, simply because there was no proper way to test them. It is typically the technician's best guess as to whether a problem exists which necessitates replacement of the pressure switch. Thus, many service calls could have been resolved easily if the pressure switch was first able to be tested properly before being replaced. A service technician using a pressure-measuring device such as a manometer can test "static pressure" in the line to see if there is enough pressure to close the switch, but this will not reveal whether or not the pressure switch itself is working properly.

In light of this, a significant need exists in the HVAC field for the diagnosis and calibration of pressure switches. Pressure switches are "safety devices" in today's modern heating systems. These safety devices shut the heating system down should there be a problem with expelling the flue gas which contains carbon monoxide. They also insure that the system is getting enough fresh air for the correct and safe combustion of the fuel gas mixture. Since pressure switches are safety devices used on all high-efficiency heating systems used for heating residential, commercial and industrial buildings, it is extremely important that any malfunction of a pressure switch is properly diagnosed, and, if it is an adjustable pressure switch, that it is set correctly.

Prior art calibration devices also do not allow one to accurately diagnose pressure switch failure, or impending failure. Often the service technician must simply guess if a pressure switch has failed, or else guess the remaining life expectancy of a pressure switch by exchanging the pressure switch to see if the replacement switch corrected the problem. U.S. Pat. No. 7,441,439 to the present inventor McFarland, which is incorporated herein by reference in its entirety, teaches a portable pressure switch tool that can be used to create pressure or vacuum in order to test, set or adjust a pressure switch to the manufacturer's specifications while in the field. Prior to the '439 patent to McFarland, it was not possible to accurately diagnose early failure or possible failure of a pressure switch that was starting to go bad. Even worse, technicians have wasted valuable time being called back to a worksite after replacing a pressure switch, only to find out that the problem was the flue, or a blocked intake or condensate system.

While the '439 patent to McFarland teaches a device that is useful for creating pressure or vacuum in order to test, set, or adjust a pressure switch to the manufacturer's specifications while in the field, the device includes manual control valves for adjusting the vacuum. This typically requires the use of both hands in order to operate the device. Therefore, there exists a need for an HVAC service technician to be able to quickly, easily and accurately set and/or calibrate adjustable pressure switches in an HVAC system without having to operate manual control valves. It would also be advantageous to provide a hand-held calibration and diagnostic tool that can be used on pressure switches without having to use both hands to operate manual control valves. These and other features and advantages of the present invention will become more apparent with reference to the accompanying specification and claims.

SUMMARY OF THE INVENTION

In general, the present invention is an apparatus for calibration and testing of residential and commercial HVAC system pressure switches. The apparatus creates a controlled vacuum for testing the pressure switches, so technicians can tell exactly when a pressure switch closes and opens. This either proves that the switch is within specification, or identifies if the switch is starting to fail.

A first aspect of the invention provides an apparatus for calibrating and testing a pressure switch, the apparatus comprising: (a) an air compressor having a vacuum-side inlet and a pressure-side outlet; (b) at least one vacuum inlet nozzle in fluid communication with the vacuum-side inlet of the air compressor, the at least one vacuum inlet nozzle being located on the external surface of the housing; (c) a positive pressure outlet nozzle in fluid communication with the pressure-side outlet of the air compressor; (d) a circuit board located on the inside of the housing (e) a battery located on the inside of the housing for supplying power to the circuit board; (f) an increase voltage button located on the external surface of the housing and in electrical communication with the circuit board, wherein activating the increase voltage button will cause the circuit board to increase the voltage supplied to the compressor pump; (g) a decrease voltage button located on the external surface of the housing and in electrical communication with the circuit board, wherein activating the decrease voltage button will cause the circuit board to decrease the voltage supplied to the compressor pump; (h) a pair of conductivity indicator lead inputs located on the external surface of the housing and in electrical communication with the circuit board; (i) a conductivity indicator light located on the external surface of the housing and in electrical communication with the circuit board, wherein the conductivity indicator light is operable to visually indicate whether the pressure switch is open or closed; and (j) an on/off button located on the external surface of the housing for completing an electrical circuit between the battery and the circuit board, wherein when the on/off button is placed in the "on" position, the circuit is completed and the battery, the air compressor, the increase and decrease voltage buttons, and the conductivity indicator light are operational.

Another aspect of the invention provides an apparatus for calibrating and testing a pressure switch, the apparatus comprising: (a) a housing including an inside and an external surface; (h) an air compressor located on the inside of the housing, the air compressor including a vacuum-side inlet and a pressure-side outlet; (c) a first vacuum inlet nozzle located in the external surface of the housing, the first vacuum inlet nozzle being in fluid communication with the vacuum-side inlet of the air compressor; (d) a second vacuum inlet nozzle located in the external surface of the housing, the second vacuum inlet nozzle being in fluid communication with the vacuum-side inlet of the air compressor; (e) a positive pressure outlet nozzle in fluid communication with the pressure-side outlet of the air compressor, wherein the positive pressure outlet nozzle is located inside the housing of the apparatus; (f) a circuit board located on the inside of the housing; (g) a battery located on the inside of the housing for supplying power to the circuit board; (h) an increase voltage button located on the external surface of the housing and in electrical communication with the circuit board, wherein activating the increase voltage button will cause the circuit board to increase the voltage supplied to the compressor pump; (i) a decrease voltage button located on the external surface of the housing and in electrical communication with the circuit board, wherein activating the decrease voltage button will cause the circuit board to decrease the voltage supplied to the compressor pump; (i) a pair of conductivity indicator lead inputs located on the external surface of the housing and in electrical communication with the circuit board; (k) a conductivity indicator light located on the external surface of the housing and in electrical communication with the circuit board, wherein the conductivity indicator light is operable to visually indicate whether the pressure switch is open or closed; and (l) an on/off button located on the external surface of the housing for completing an electrical circuit between the battery and the circuit board, wherein when the on/off button is placed in the "on" position, the circuit is completed and the battery, the air compressor, the increase and decrease voltage buttons, and the conductivity indicator light are operational.

Another aspect of the invention provides an apparatus for calibrating and testing a pressure switch, the apparatus comprising: (a) a housing including an inside and an external surface; (b) an air compressor located on the inside of the housing, the air compressor including a vacuum-side inlet and a pressure-side outlet; (c) a vacuum inlet nozzle located in the external surface of the housing, the vacuum inlet nozzle being in fluid communication with the vacuum-side inlet of the air compressor; (d) a positive pressure outlet nozzle in fluid communication with the pressure-side outlet of the air compressor; (e) a circuit board located on the inside of the housing; (t) a battery located on the inside of the housing for supplying power to the circuit board; (g) an increase voltage button located on the external surface of the housing and in electrical communication with the circuit board, wherein activating the increase voltage button will cause the circuit board to increase the voltage supplied to the compressor pump; (h) a decrease voltage button located on the external surface of the housing and in electrical communication with the circuit board, wherein activating the decrease voltage button will cause the circuit board to decrease the voltage supplied to the compressor pump; (i) a pair of conductivity indicator lead inputs located on the external surface of the housing and in electrical communication with the circuit board; (j) a conductivity indicator light located on the external surface of the housing and in electrical communication with the circuit board, wherein the conductivity indicator light is operable to visually indicate whether the pressure switch is open or closed; (k) a pressure measuring nozzle located on the external surface of the housing; (l) a pressure measuring device located on the inside of the housing and being in fluid communication with the pressure measuring nozzle for measuring the amount of pressure communicated through the pressure measuring nozzle; (m) a pressure readout screen located on the external surface of the housing and in electrical communication with the circuit board and the pressure measuring device, wherein the pressure readout screen is operable to visually indicate the amount of pressure being measured by the pressure measuring device; and (n) an on/off button located on the external surface of the housing for completing an electrical circuit between the battery and the circuit board, wherein when the on/off button is placed in the "on" position, the circuit is completed and the battery, the air compressor, the increase and decrease voltage buttons, the pressure measuring device, and the conductivity indicator light are operational.

The calibration/diagnostic apparatus of the present invention provides vacuum and air pressure by means of a small battery-powered air compressor located inside its housing, which is controlled by a microchip circuit board, as is known in the art. In one embodiment, a conductivity indicator is incorporated within the housing of the apparatus and the apparatus is typically associated with a free-standing pressure test means that is removably attachable to the apparatus. In another embodiment, both the pressure test means and conductivity indicator are incorporated within the housing of the apparatus.

The nature and advantages of the present invention will be more fully appreciated from the following drawings and detailed description.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

Figure 1:
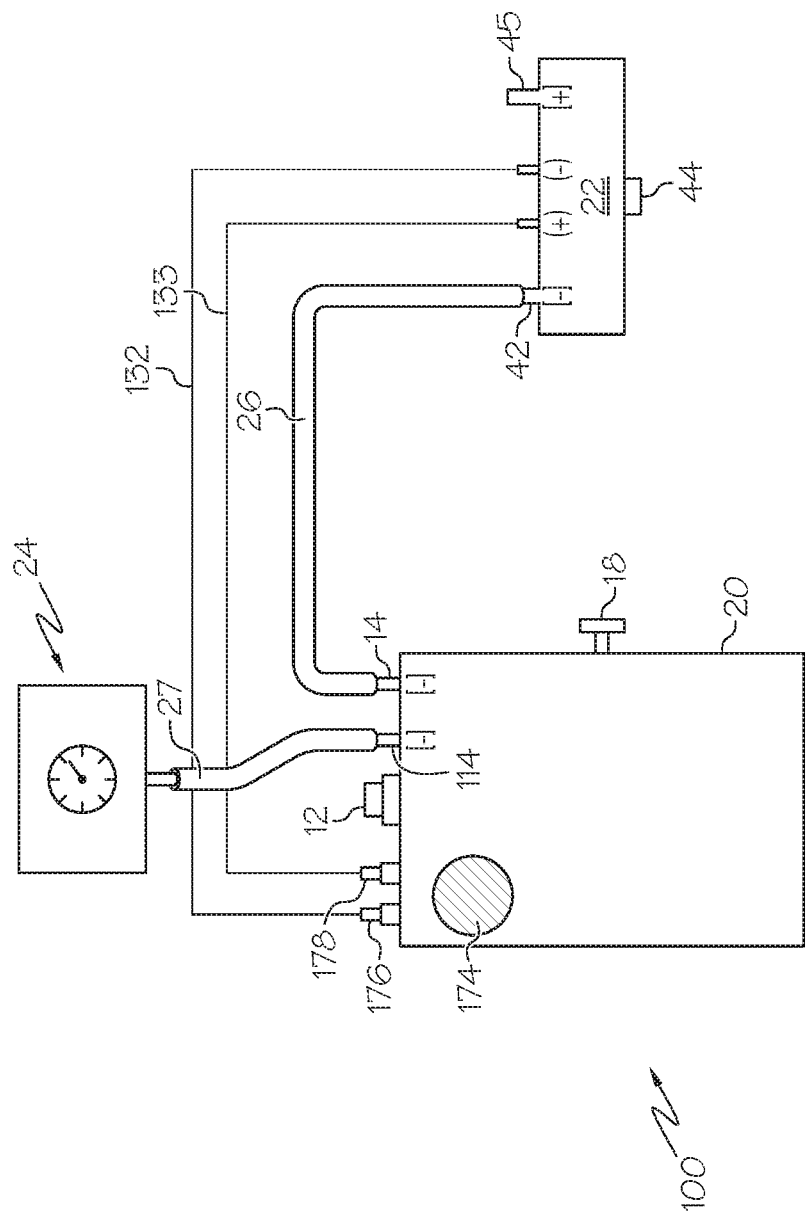
FIG. 1 is a schematic view of a prior art embodiment of a portable calibration apparatus, connected to a pressure switch.

Definitions:

As defined herein, an "air pressure measuring device" is a tool for accurate measurement of air pressure. With the present invention, this tool is used to measure the pressure being transmitted from the inventive apparatus to a pressure switch. Typically, an air pressure measuring device can measure absolute pressure, typically in pressure units of "inches of water," For example, a Ailagnehelic gage (such as one manufactured by Dwyer), a differential pressure manometer, a digital manometer, or equivalent pressure gage have all been found particularly suitable as an air pressure measuring device for the invention.

A "circuit board" is an insulated board on which interconnected circuits and components such as microchips are mounted or etched. The circuit board controls the sequence of events needed for proper operation of the apparatus of the invention, including the control and distribution of power to the various electronic components.

"Electrical components" are any elements of the apparatus that run or are powered by electricity. Typically the electrical components of the present invention include, but are not limited to, a circuit board, an air compressor, a battery, an increase voltage button, a decrease voltage button, conductivity indicator lead inputs, a conductivity indicator light, and an on/off button.

A "conductivity indicator" is generally an electrical measuring device used to test whether an adjustable pressure switch is open or closed. Typically the conductivity indicator of the present invention includes a pair of test leads lead inputs) and a light.

A "pressure test means" is the combination of an air pressure measuring device and a connecting means such as a flexible hose or tubing.

The present invention is a calibration and diagnostic apparatus for use with pressure switches that are typically used in HVAC systems and residential and commercial furnaces. The apparatus is able to calibrate adjustable pressure switches to manufacturers' specifications. While saving contractors from carrying a large inventory of pressure switches on their trucks and from having to leave the job site to buy pre-calibrated switches.

While U.S. Pat. No. 7,441,439 to McFarland (the present inventor), which is incorporated herein by reference in its entirety, discloses the use of a recirculation circuit 203 and a manual control valve 18 to regulate the vacuum strength (see prior art FIGS. 1-4), the present invention improves upon this and regulates the vacuum strength by controlling the amount of voltage supplied to the air compressor pump (see FIGS. 5-14), thereby allowing a user to regulate the strength of the pump vacuum without the need of a recirculation circuit 203 or a manual control valve 18. Specifically, the amount of voltage supplied to the air compressor pump is controlled by pressing an "up arrow" button 60 or a "down arrow" button 62 on the external surface of the apparatus housing (see, e.g. FIG. 5). By directly controlling the speed of the motor on the air compressor pump with the down and up buttons rather than a control valve, the user can change the vacuum strength and perform tests, as needed, without the need for any other instrument, and without having to use both hands in order to hold the apparatus and operate an adjustable control valve. The technician thus has more precise control of the vacuum created in order to close and open the pressure switch being tested, and is typically able to perform the tests with one hand, with all of the important information (e.g. from a circuit board and manometer) in front of him. The present invention thus provides a fully electronic tool that eliminates the need for a manual control valve.

In the following Figures, positive and negative symbols are used for both pressure and electricity. Thus, for clarity sake, positive and negative pressure outlets will be indicated with [+] and [−], respectively, while positive and negative electrical poles will be indicated with (+) and (−), respectively, in the Figures.

With reference to FIG. 1, a prior art embodiment of a pressure switch calibration and diagnostic apparatus is illustrated, which incorporates a conductivity indicator 174 within the housing of the unit. The apparatus 100 includes an on/off button 12 on the top of the housing, a first vacuum inlet nozzle 14, and a bypass control valve 18. The bypass control valve 18 is typically a needle valve with an external control knob, and is capable of providing fine regulation of airflow. The external surface of the housing 20 further includes a second vacuum inlet nozzle 114, a conductivity indicator light 174, and conductivity indicator lead inputs 176 and 178. As illustrated, the first vacuum inlet nozzle 14 can be removably connected to the pressure switch 22 by way of flexible hose 26. The pressure switch 22 is also connected to conductivity indicator leads 176 and 178 by electrical test leads 132 and 133. When this circuit is completed, the conductivity indicator light 174 illuminates. As illustrated, either vacuum inlet nozzle 14 or 114 of the apparatus 100 is removably connectable to an external pressure measuring device 24 (such as a manometer) by way of flexible hose 27.

Figure 2:
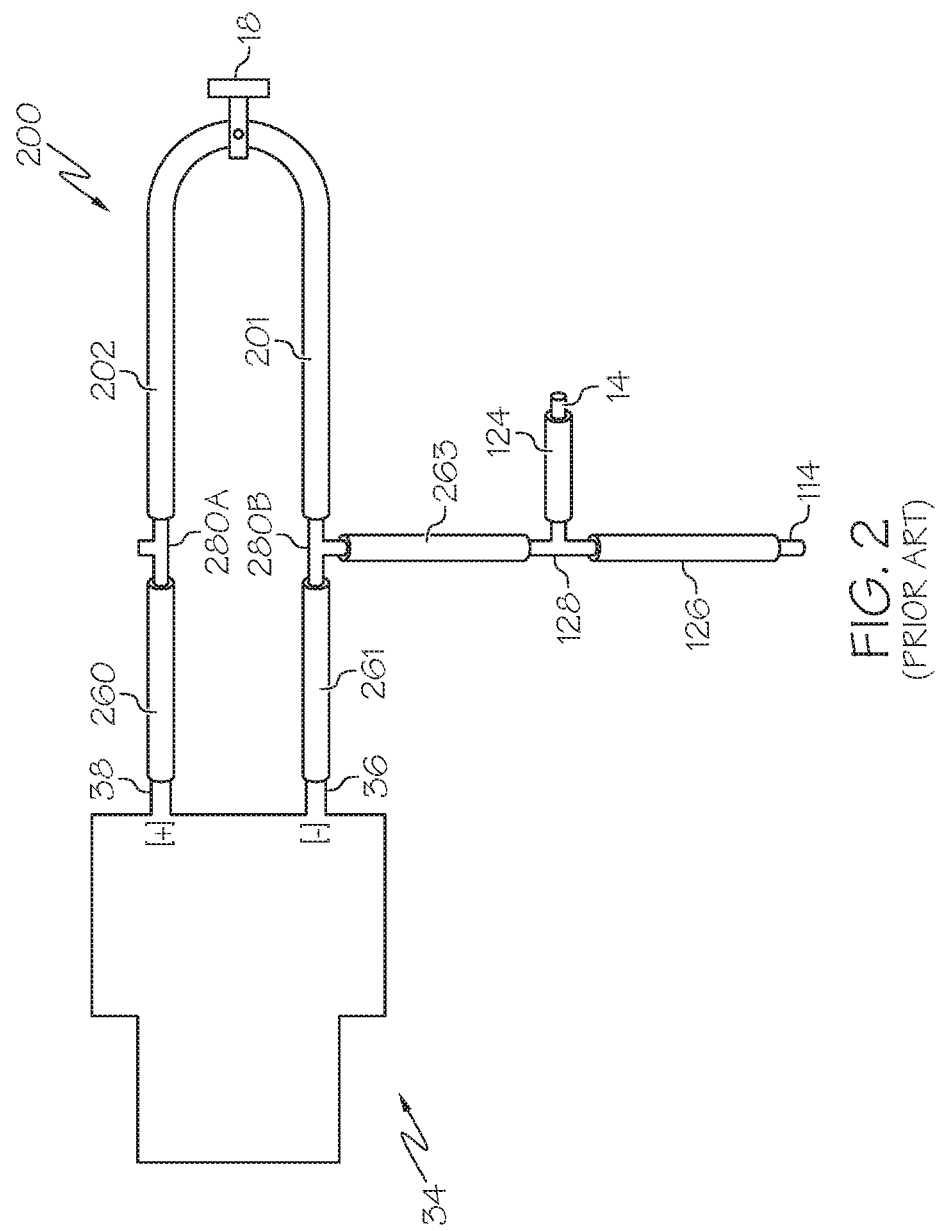
FIG. 2 is a schematic view of the interior air pressure circuitry of the prior art portable calibration apparatus of FIG. 1.
Figure 3:
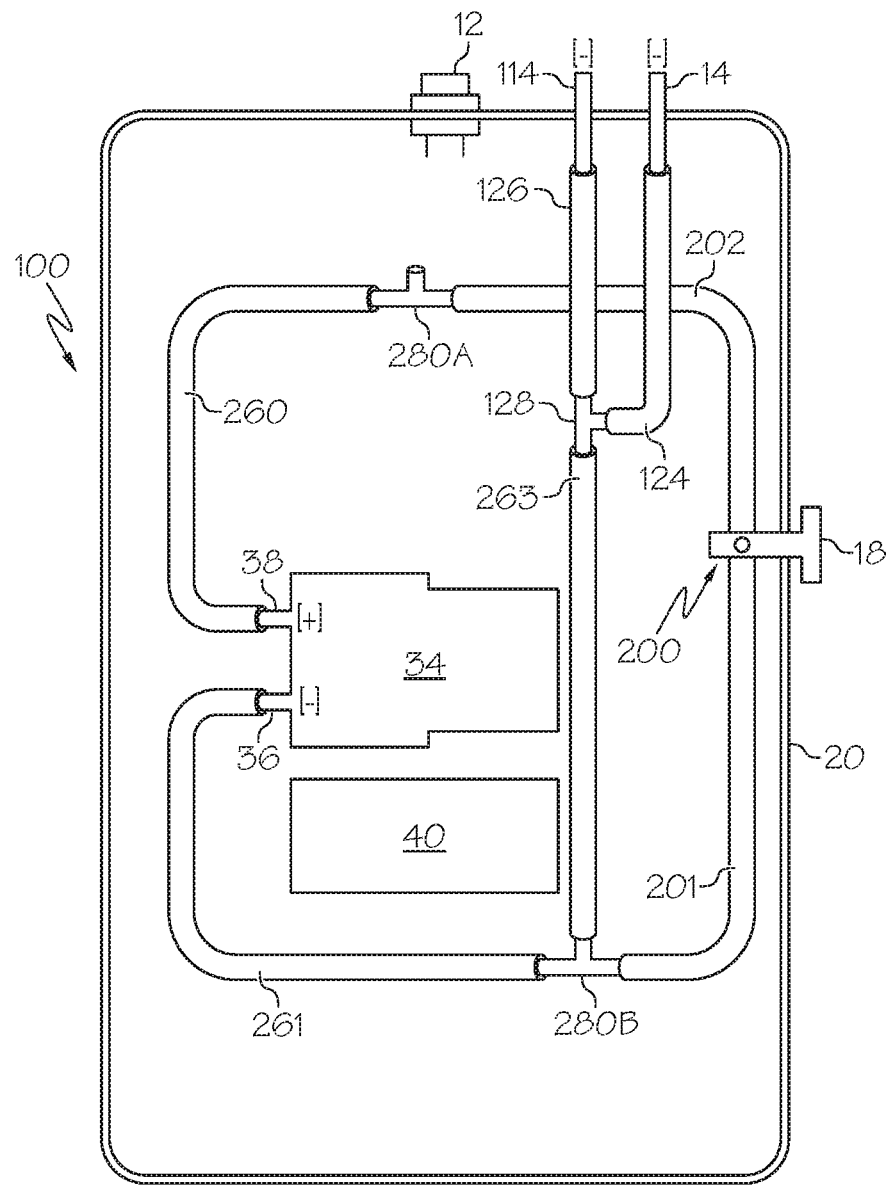
FIG. 3 is a plan view of the interior air pressure circuitry of the prior art portable calibration apparatus of FIG. 1.

FIGS. 2 and 3 illustrate a schematic and plan view, respectively, of the internal air pressure circuitry of the prior art apparatus of FIG. 1. Specifically, FIG. 2 shows the air compressor 34 with a vacuum inlet 36 and a pressure outlet 38 connected in fluid communication by flexible tubing 260, 261, 263, 124 and 126, and T-pieces 280A and 128 to the first vacuum inlet nozzle 14 and the second vacuum inlet nozzle 114. A recirculation circuit 203 is created by flexible tubing 201, 202 running from T-pieces 280A and 280B to the bypass control valve 18. Positive pressure flows freely from the unused internal positive pressure opening of T-piece 280A into the inside of the apparatus. Also, T-piece 128 serves to divide the vacuum pressure generated by the compressor 34 into two parts, leading via flexible tubing 124 and 126 to the first vacuum inlet nozzle 14 and the second vacuum inlet nozzle 114, respectively.

FIG. 3 illustrates the air circuitry of the prior art apparatus of FIG. 2 when assembled within the housing 20. Viewing either FIG. 2 or FIG. 3, when the air compressor 34 is in the "on" position, gas or air is drawn into the vacuum-side inlet 36, which reduces the air pressure on the vacuum-side connecting means 261. In a closed system, a vacuum is created. The reduced pressure at the vacuum inlet 36 is communicated via the connecting means 261 and 263 and T-piece 280B to the first and second vacuum inlet nozzles 14, 114, to pull or draw air into the nozzles. Likewise, positive pressure is created by the compressor 34 as gas or air is pumped out of the pressure outlet 38, and is communicated to the unused opening of the T-piece 280A, i.e. an internal positive pressure opening, to expel compressed air harmlessly within the inside of the housing 20.

The negative pressures at the nozzles 14, 114 are regulated by increasing or decreasing the amount of air being circulated through the recirculation circuit 203. The bypass control valve 18 performs this function. When the bypass control valve 18 is closed, the recirculation circuit 203 is closed and there is no connection between the pressure circuitry and the vacuum circuitry. This enables the compressor 34 to achieve maximum vacuum and pressure exerted at the nozzles 14, 114. When the bypass control valve 18 is opened, then a portion of the flow of gas from the pressure-side outlet 38 of the air compressor 34 can be re-circulated back to the vacuum-side inlet 36 through the recirculation circuit 203 via the flexible tubing 201 and 202 and T-pieces 280A and 280B, leading to and away from the valve 18. Increased air recirculation decreases the vacuum pressures at nozzles 14 and 114. Thus, the mass air flow entering the first and second vacuum inlet nozzles 14, 114, and the mass air flow of air exiting the T-piece 280A, is regulated by means of the bypass control valve 18. Adjusting this valve 18 permits the user to control the vacuum pressure at the first and second vacuum inlet nozzles 14, 114, and to both test and calibrate pressure switches. The bypass control valve 18 thus prevents undue stress on the air compressor by controlling the amount of air re-circulating through the recirculation circuit, and controls the amount of air to be pulled in from the vacuum port 42.

Figure 4:
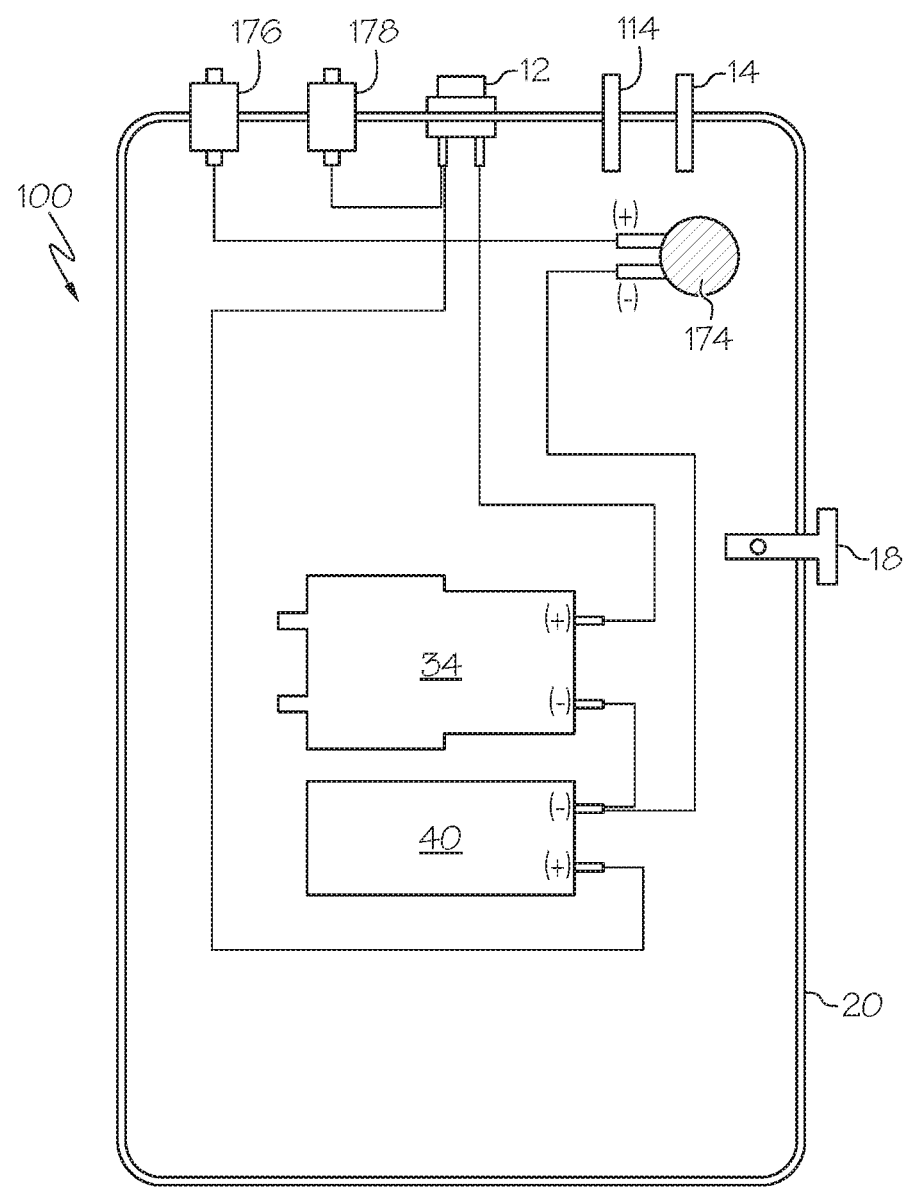
FIG. 4 is a plan view of the interior electrical circuitry of the prior art portable calibration apparatus of FIG. 1.

FIG. 4 is a schematic view of the interior electrical circuitry of the prior art apparatus 100 of FIG. 1, and includes a battery 40 which provides electrical power to the air compressor 34. The positive pole (+) of the battery 40 is connected to one pole of the on/off button 12, and the negative pole (−) of the battery 40 is connected to both the negative pole (−) of the air compressor 34 and the negative pole (−) of the conductivity indicator 174. The positive pole (+) of the air compressor 34 is connected to another pole of the on/off button 12, such that when the on/off button is placed in the "on" position, the circuit is completed and the air compressor is operated. Turning the on/off button to the "off" position will break the circuit and the air compressor 34 will turn off. For simplicity sake, the air pressure circuitry of FIGS. 2 and 3 is shown separately from the electrical circuitry of FIG. 4; however, both of these circuitries are housed together within housing 20 of this prior art apparatus 100.

Figure 5:
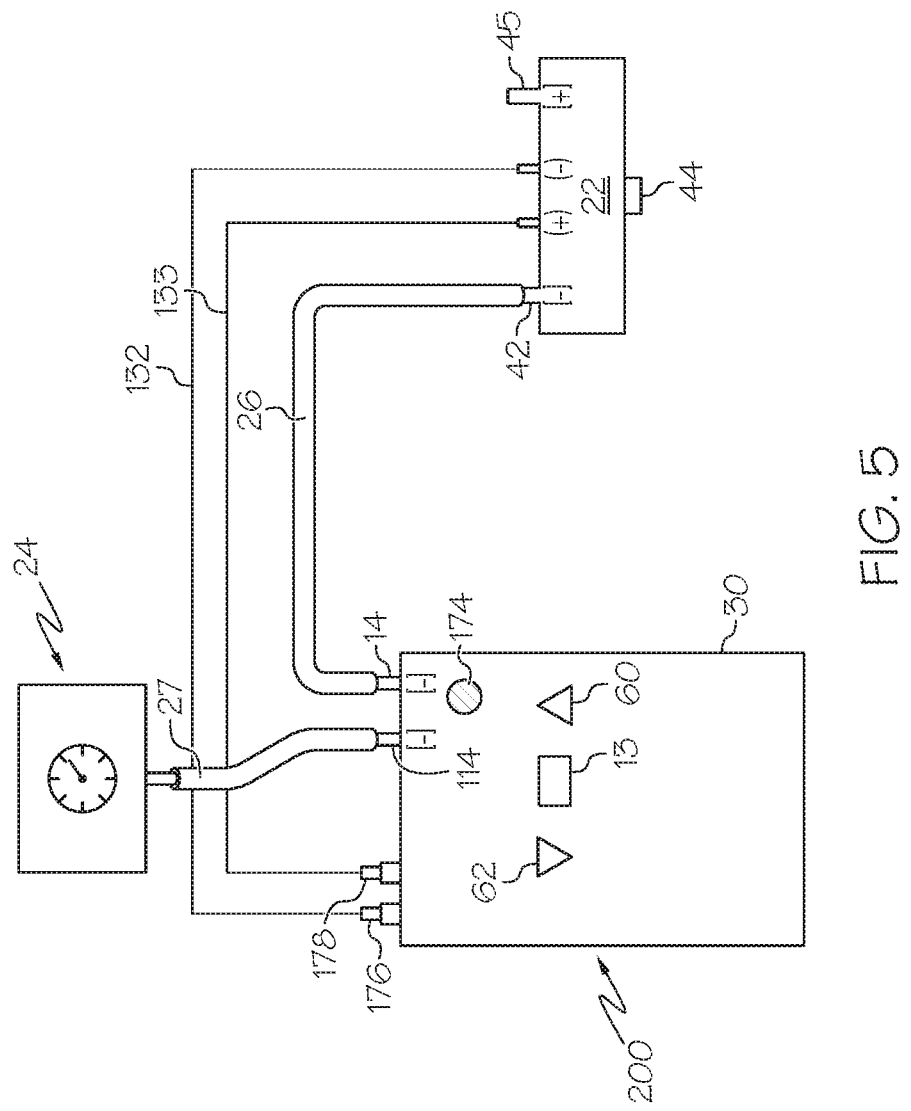
FIG. 5 is a schematic view of one embodiment of a portable calibration apparatus according to the present invention, connected to a pressure switch and an external manometer.

In FIGS. 5-8, like numbers are used to indicate like parts as shown in the prior art embodiment illustrated in FIGS. 1-4. With reference now to FIG. 5, an alternative embodiment 200 of the pressure switch calibration and diagnostic apparatus of the present invention is illustrated. Similar to the apparatus 100 in FIGS. 1-4, this embodiment incorporates a conductivity indicator 174 within the inside of the housing of the unit, and thus provides the service technician the ability to test pressure switches without having to use an external conductivity indicator. The apparatus 200 also includes an on/off button 13 which has been moved to the center face of the housing 30 (compared to the button 12 at the top of the housing in FIGS. 1-4), as well as a first vacuum inlet nozzle 14, a second vacuum inlet nozzle 114, an "up" arrow or increase voltage button 60, a "down" arrow or decrease voltage button 62 conductivity indicator light 174, and conductivity indicator lead inputs 176 and 178 in the external surface of the housing 30. Unlike the prior art embodiment of FIGS. 1-4, there is no need for a bypass control valve 18 or any interior recirculation circuit 203 (see FIG. 2). Pressing the increase voltage button 60 will increase the voltage supplied to, and thus the speed and the induced vacuum created by the compressor pump, while pressing the decrease voltage button 62 will do the opposite, ultimately decreasing the induced vacuum.

As illustrated in FIG. 5, the first vacuum inlet nozzle 14 can be removably connected to the vacuum port 42 of pressure switch 22 by way of flexible hose 26. The pressure switch 22 is also connected to conductivity indicator leads 176 and 178 by electrical test leads 132 and 133. When this circuit is completed, the conductivity indicator light 174 illuminates. As illustrated, either vacuum inlet nozzle 14 or 114 of the apparatus 100 is removably connectable to an external pressure measuring device 24, such as a manometer or magnehelic gage, by way of flexible hose 27.

Figure 6:
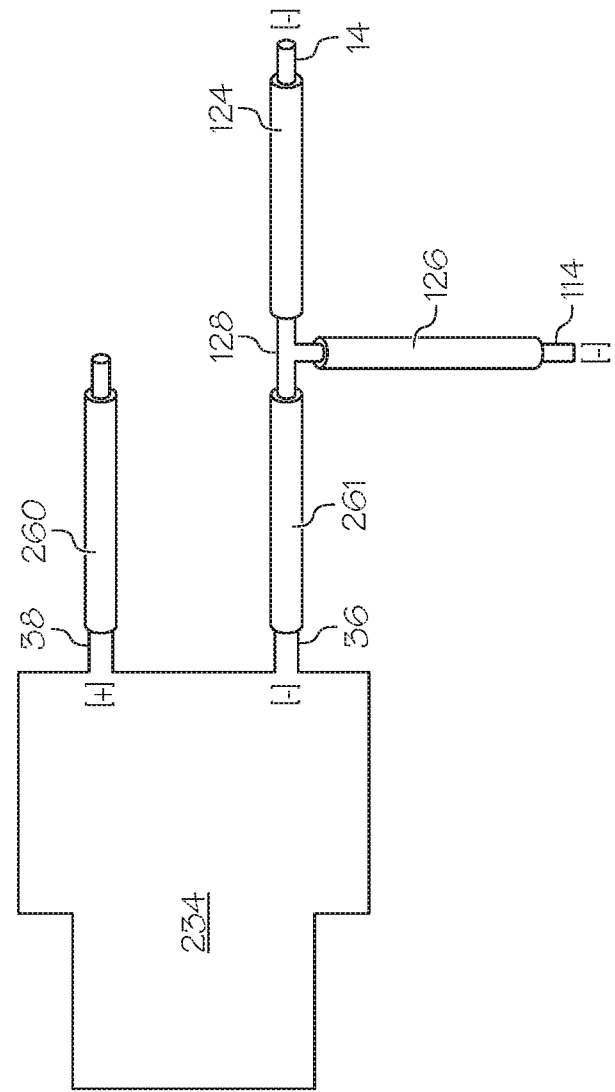
FIG. 6 is a schematic view of the interior air pressure circuitry of the portable calibration apparatus of FIG. 5.
Figure 7:
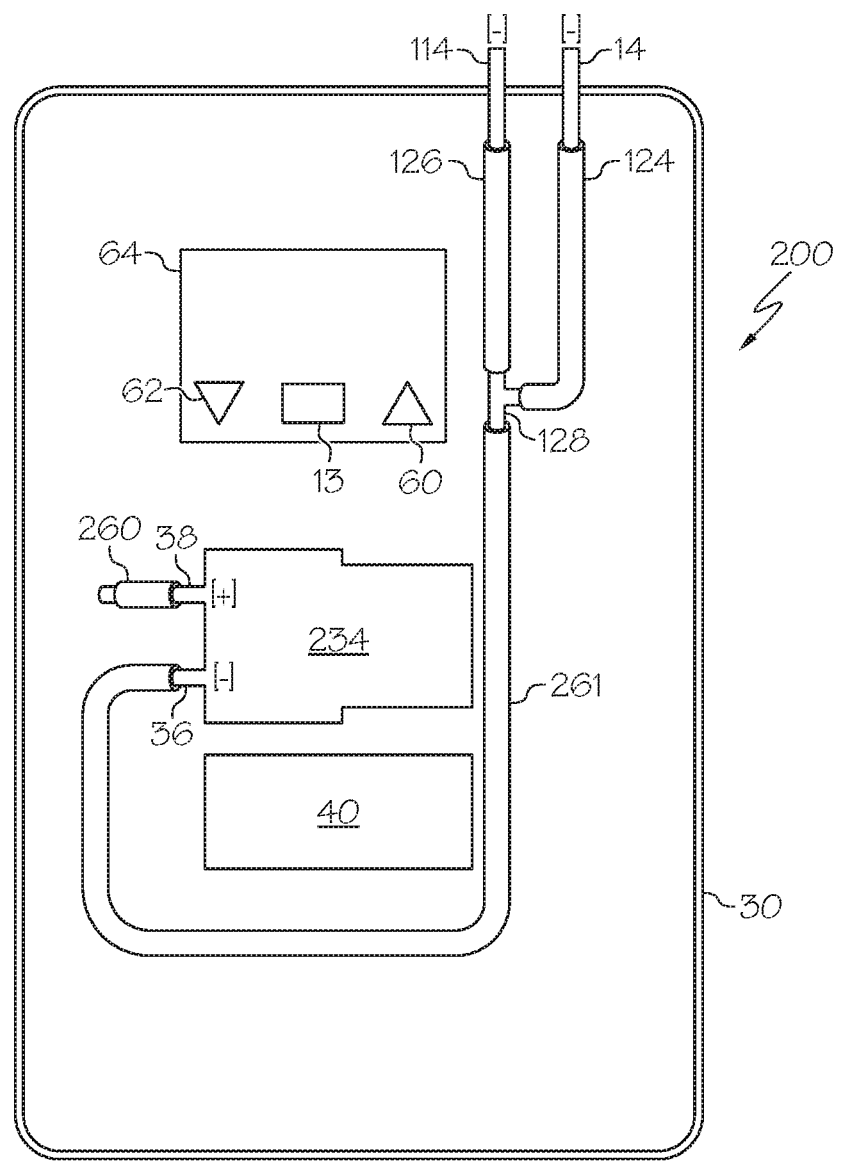
FIG. 7 is a plan view of the interior air pressure circuitry of the portable calibration apparatus of FIG. 5.

FIGS. 6 and 7 illustrate a schematic and plan view respectively, of the internal air pressure circuitry of device of FIG. 5. Specifically, FIG. 6 shows an air compressor 234 with a vacuum inlet 36 and a pressure outlet 38. T-piece 128 serves to divide the vacuum pressure generated at the vacuum inlet 36 of the compressor 34 into two parts. Specifically, vacuum pressure is passed through flexible tubing 261 and splits at T-piece 128 to flexible tubing 124 and the first vacuum inlet nozzle 14, as well as from T-piece 128 to flexible tubing 126 and the second vacuum inlet nozzle 114. Significantly, it can be appreciated that the recirculation circuit 203 and the manual control valve 18 of the apparatus of FIG. 2 is not present in the improved apparatus of FIG. 6. Also, positive pressure flows freely inside the housing, typically from flexible tubing 260 attached to the unused internal positive pressure outlet 38.

FIG. 7 illustrates the air circuitry shown in FIG. 6 when assembled within the housing 30 of the apparatus 200. Viewing either FIG. 6 or FIG. 7, when the air compressor 234 is in the "on" position, gas or air is drawn into the vacuum-side inlet 36 which reduces the air pressure on the vacuum-side connecting means 261. In a closed system, the vacuum created at the vacuum inlet 36 is communicated via tubing 261, T-piece 128 and tubing 124 and 126 to the first and second vacuum inlet nozzles 14, 114 to pull or draw air into the nozzles. The strength of the negative pressure generated at the nozzles 14, 114 is regulated by increasing or decreasing the motor speed of the compressor 234 by using the up and down arrows 60, 62 located on the external surface of the housing 30 (see also FIG. 5). Increasing the motor speed of the compressor 234 in this manner enables the compressor to achieve maximum or minimum vacuum exerted at the nozzles 14, 114. Thus, the degree of mass air flow entering the first and second vacuum inlet nozzles 14, 114, as well as the degree of mass air flow exiting open tubing 260 is regulated by adjusting the up and down buttons 60, 62. Adjusting the compressor motor speed can thus be done with one hand by the user, and permits the user to control the vacuum pressure at the first and second vacuum inlet nozzles 14, 114 without the need for using a manual control valve 18 or recirculation circuit 203 (as seen in FIG. 2). Rather, buttons 60 and 62 perform this task, which are located on the face of the external surface of the housing 30 of the apparatus 200. Positive pressure is also created by the compressor 234 as gas or air is pumped out of the pressure outlet 38, and is communicated out open tubing 260 as an internal positive pressure outlet nozzle, to expel compressed air harmlessly within the inside of the housing 30. This allows excess pressure to be released, acts as a "bleed off" to control the vacuum created by the pump 234, and helps to regulate the amount of air expelled into the housing. This in turn helps to regulate the amount of vacuum that is produced.

Figure 8:
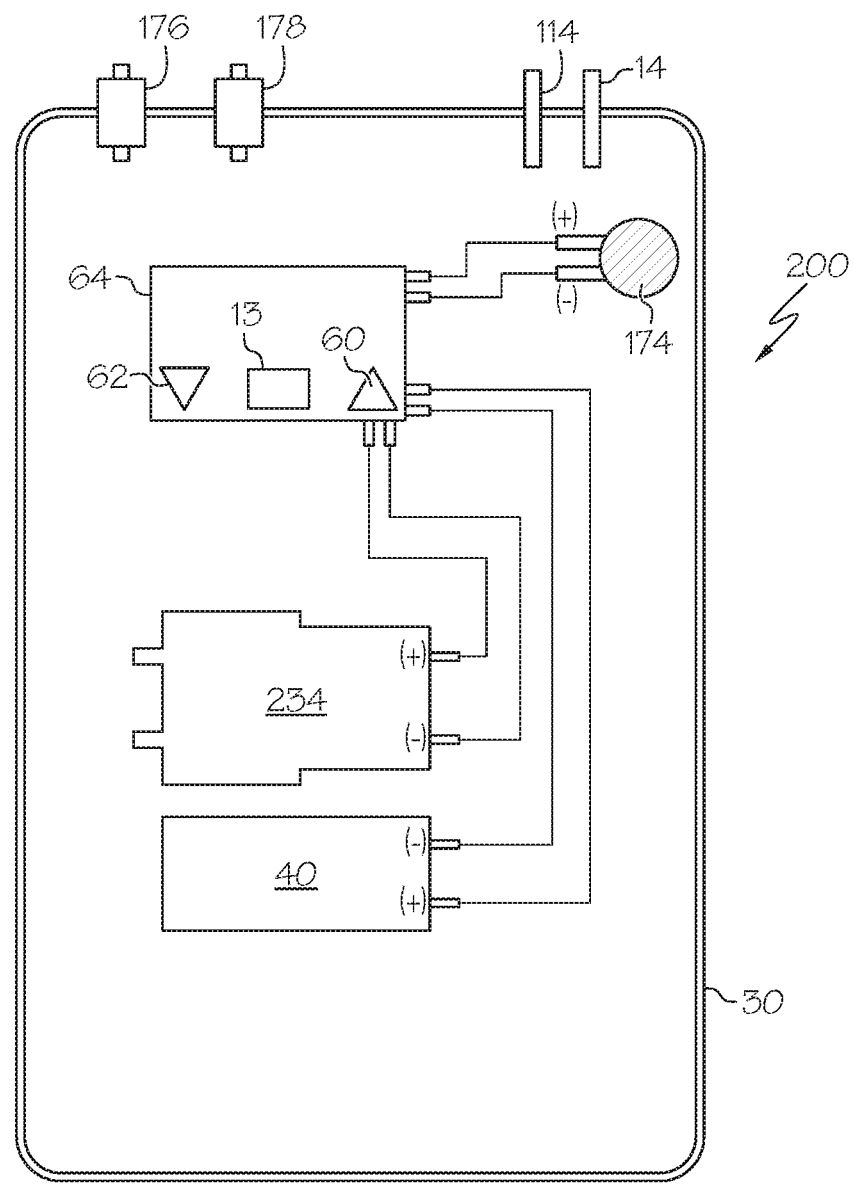
FIG. 8 is a plan view of the interior electrical circuitry of the portable calibration apparatus of FIG. 5.

FIG. 8 is a plan view of the interior electrical circuitry of the apparatus 200. Similarly to FIG. 4, the apparatus 200 of FIG. 12 includes a battery 40 which provides electrical power to the air compressor 234 via a circuit board 64. The circuit board 64 receives energy when turned "on" from the battery 40, receives input from the on/off button 13 and the up and down arrows 60, 62 of the apparatus, and also connects to the conductivity indicator 174. Thus, when the on/off button 13 is placed in the "on" position, the circuit is completed and the battery 40, the air compressor 234, the up and down buttons 60, 62 and the conductivity indicator 174 are operational. Turning the on/off button 13 to the "off" position will break the circuit and these portions of the apparatus 100 will turn off. For simplicity sake, the air pressure circuitry of FIGS. 6 and 7 is shown separately from the electrical circuitry of FIG. 8; however, both of these circuitries are to be housed together within housing 30 of the apparatus 200.

As seen best in FIG. 5, the apparatus 200 is typically used in conjunction with an air pressure measuring device 24 such as a manometer. The conductivity indicator 174 is used to measure electrical resistance in ohms across the actuation switch of the pressure switch 22. A lack of electrical current across this switch indicates that there is not enough vacuum or air flow to complete the electrical circuit within the pressure switch, or that the pressure switch has failed.

The air compressor 234 within the apparatus 200 of FIGS. 5 and 8 provides the vacuum production for the apparatus via nozzles 14 and 114, and the up and down buttons 60, 62 are used to regulate the amount of voltage transmitted via the control panel to the air compressor 234. Rather than the bypass control valve 18 and recirculation circuit 203 (including 280A, 280B, 201, 202, 263) of prior art FIGS. 1 and 2, the up and down buttons 60 and 62 regulate the amount of air that can be drawn through the nozzles 14 and 114, and thus the pressure value of the vacuum. Being able to increase or decrease the vacuum strength by simply pressing the up and down buttons 60, 62 allows the user of the present invention to use a single hand to adjust airflow, as compared to the previous embodiment of this invention in which two hands are typically required to hold the apparatus while adjusting the bypass control valve 18. In the configuration shown in FIG. 5, the vacuum inlet nozzles 14, 114 are connected into fluid communication with a vacuum port 42 of the pressure switch 22 (via tubing 26) and the manometer 24 (via tubing 27), respectively. The arrow buttons 60, 62 allow the user to easily prevent undue stress on the air compressor by controlling the amount of air to be pulled in from the vacuum port 42.

In use, the various embodiments of the apparatus of the invention can be used for calibrating an adjustable pressure switch. For example, looking at FIG. 5, the apparatus 200 can be used to calibrate an adjustable pressure switch 22 which operates in a "normally open" manner. This means that until a sufficient vacuum is measured across the pressure switch 22, the electrical circuit is open and no electrical signal is generated. The adjustable pressure switch 22 has a set screw 44 which is used to activate or deactivate an electrical circuit when the target pressure differential across the pressure-side port 45 and the vacuum-side port 42 is achieved. After assembling the circuitry, as illustrated in FIG. 5, the user adjusts the set screw 44 on the adjustable pressure switch 22 to be calibrated to "full open" so that there is little or no differential between the vacuum port 42 and the pressure port 45, and to completely open the switch 22 to the calibration apparatus 200. The calibration apparatus 200 is then turned "on" by pushing button 13 to operate the air compressor 34, and the air compressor 234 strength is slowly adjusted, via pushing either the increase voltage button 60 or decrease voltage button, until the pressure reading on the manometer 24 matches the manufacturer's specified pressure (or vacuum) for the pressure switch 22. The user then slowly adjusts the set screw 44 on the adjustable pressure switch 22 until the conductivity indicator confirms that electricity is flowing across the switch 22 and it has closed. At this point, the user slowly adjusts the set screw 44 on the adjustable pressure switch 22 until the indicator confirms that the switch is open. At this point the pressure switch is calibrated. In summary, then, if the indicator confirms that the switch is open, the user slowly adjusts the set screw on the adjustable pressure switch until the indicator confirms that the switch is closed, then slowly adjusts the set screw on the pressure switch until the indicator confirms that the switch is open. At this point the pressure switch is calibrated.

The apparatus of the present invention can also be used as a diagnostic tool for early detection of pressure switch failure. That is, the apparatus can also be used to hold a specific pressure differential on any pressure switch, adjustable or not, thereby enabling diagnostic testing of the pressure switch. For example, to diagnose a pressure switch failure for a "vacuum, normally open" pressure switch similar to the previous example above, the apparatus 200 is first attached to the pressure switch 22 as explained above. Once the proper air pressure (or vacuum) is attained and the test leads 176, 178 of the conductivity indicator 174 are attached, the user slowly adjusts the increase voltage button 60 to increase the amount of vacuum pressure transmission to the pressure switch from the nozzle 14 until the pressure switch closes (as confirmed by the conductivity indicator 174). If this closing pressure is not within the manufacturer's recommended specifications, then the switch should be adjusted, and, if it is not adjustable, should be considered unsafe and should be replaced, regardless of whether the furnace is presently operating properly or not.

Pressure switches that have had water in them are notorious for being a "sticking switch." Water develops within pressure switches for a number of reasons. High efficiency furnaces operate at lower temperatures thus resulting in condensation. Older furnaces were often operated at much higher temperatures, thus not allowing any condensation to form. If there is a trap in the tubing (i.e. the line goes down then up) that connects the pressure switch to the furnace, the tubing may fill with water. This in turn will shut the furnace down, but water in the tubing may enter the pressure switch. Also, simply because the furnace is causing condensation, water may enter the pressure switch. Condensation contains contaminants which build up over time. If the pressure switch is made of metal it is further complicated because the water will cause rust to form on the pressure switch, which will cause the pressure switch to fail. If the pressure switch is sticking or is full of water, it should be replaced regardless of whether the furnace is presently operating properly or not. To test for a sticking pressure switch, adjust the pressure a little beyond the specified settings, using the diagnostic method explained above. The switch will be inconsistent with closing and opening if it is sticking. It also may be intermittent in operating meaning it may close then open properly one time out of about three to five trials.

By using the apparatus of the present invention one can also test for a ruptured diaphragm in the pressure switch, as the switch will close and then open shortly thereafter. This indicates that the diaphragm has moved and the switch closed because of the pressure, but if the pressure bleeds through the diaphragm, and the pressure remains constant, the diaphragm will move back and open the switch. To test this, once the correct pressure has been reached and the switch closes, wait 10 to 30 seconds. If the switch remains closed then the diaphragm located inside the switch is holding and is good. If the conductivity meter light goes out the switch has opened (on a normally closed switch), then there is leakage in the diaphragm. This switch should be replaced regardless of whether the furnace is presently operating properly or not.

Figure 9:
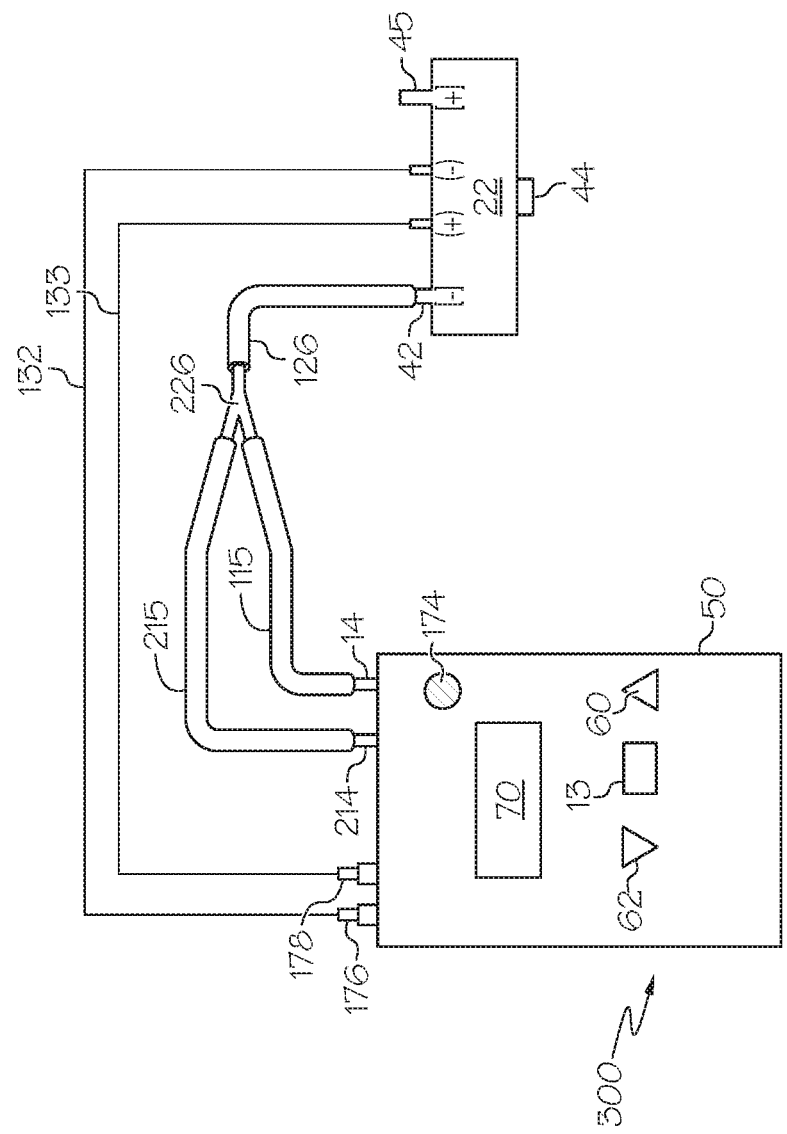
FIG. 9 is a schematic view of another embodiment of a portable calibration and test tool of the invention connected to a pressure switch, in which both a pressure test means and conductivity indicator are incorporated within the housing of the apparatus.

FIGS. 9-12 illustrate another embodiment of the present invention which incorporates both a manometer and a conductivity indicator within the inside of the housing of the calibration and diagnostic apparatus. Similar to the apparatus 200 in FIGS. 5-8, the apparatus 300 in FIG. 9 includes an on/off button 13, a vacuum inlet nozzle 14, an "up" arrow or increase voltage button 60, a "down" arrow or decrease voltage button 62, conductivity indicator light 174, and conductivity indicator lead inputs 176 and 178 on the external surface of the housing 50. The external surface of the housing 50 also includes a pressure measuring nozzle 214 (rather than the second vacuum inlet nozzle of FIGS. 4-8), and the front face of the housing 50 includes a pressure measuring device readout screen 70 (or a manometer readout screen 70). Pressure measuring nozzle 214 is connected to an internal pressure measuring device (or manometer 80, see FIG. 10). As illustrated in FIG. 9, the pressure measuring nozzle 214 and the vacuum inlet nozzle 14 can be removably connected to a pressure switch 22 by way of flexible hose 126, T-Piece 226, and hoses 215 and 115. The pressure switch 22 can also be connected to conductivity indicator leads 176 and 178 via electrical test leads 132 and 133. When this circuit is completed, the conductivity indicator light 174 illuminates.

Figure 10:
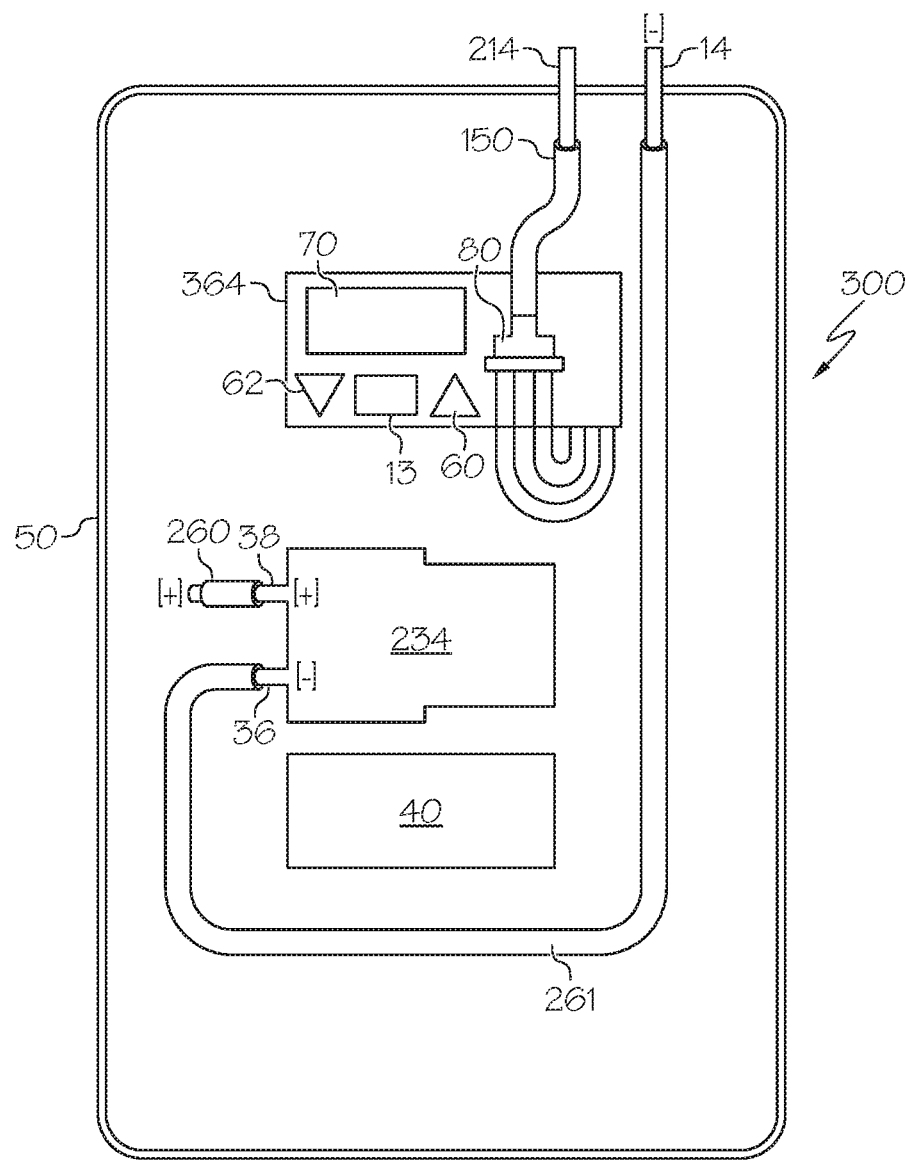
FIG. 10 is a plan view of the interior air pressure circuitry of the apparatus of FIG. 9.

FIG. 10 illustrates a plan view of the internal air pressure circuitry of the apparatus 300 of FIG. 9. Specifically, FIG. 10 shows the circuitry including the air compressor 234 having a vacuum inlet 36 and a pressure outlet 38. The vacuum inlet 36 is connected by flexible tubing 261 to the vacuum inlet nozzle 14. There is no positive pressure outlet nozzle connecting the pressure outlet 38 to the outside, such that positive pressure [+] flows freely inside the housing, typically from flexible tubing 260 attached to the unused internal positive pressure outlet 38. The internal pressure measuring device or manometer 80 connects via tubing 150 to the pressure measuring nozzle 214.

Viewing FIG. 10, when the air compressor 234 is in the "on" position, gas or air is drawn into the vacuum-side inlet 36, which reduces the air pressure on the vacuum-side connecting means 261, and the negative pressure created at the vacuum inlet 36 is communicated via tubing 261 to the vacuum inlet nozzle 14 to pull or draw air into the nozzle. Likewise, positive pressure is created by the compressor 234 as gas or air is pumped out of the pressure outlet 38, and is communicated out the unused open tubing 260 as an internal positive pressure outlet nozzle, to expel compressed air harmlessly within the inside of the housing 50. This allows excess positive pressure to be released, and acts as a "bleed off" to control the vacuum created by the pump 234. The manometer 80 measures the pressure of the gas that is communicated through the pressure measuring nozzle 214, which is typically connected externally to nozzle 14 via a T-piece to measure the pressure transmitted from a pressure switch (see FIG. 9). The pressure at the vacuum inlet nozzle 14 is regulated by increasing or decreasing the amount of voltage being sent to the compressor 234, via up and down buttons 60 and 62. Increasing the motor speed of the compressor in this manner enables the compressor 234 to achieve maximum or minimum vacuum exerted at the vacuum inlet nozzle.

Thus, the degree of mass air flow entering the vacuum inlet nozzles 14, as well as the degree of mass air flow exiting open tubing 260 is regulated by adjusting the up and down buttons 60, 62. Adjusting the compressor motor speed can typically be done with one hand by the user. A battery 40 provides electrical power to the air compressor 234 via a circuit board 64. The circuit board 364 receives input from the on/off button 13 and receives energy when turned "on" from the battery 40, and also receives input from the up and down arrows 60, 62 in the housing 30 of the apparatus, and also connects to the conductivity indicator 174. Thus, when the on/off button 13 is placed in the "on" position, the circuit is completed and the battery 40, the air compressor 234, the up and down buttons 60, 62, the manometer screen 70, the conductivity indicator 174, and internal manometer 80 are operational. Although the manometer 80 is shown in front of the manometer screen 70 in FIGS. 10 and 11, it can be appreciated that the manometer 80 is typically placed behind the screen 70, and is illustrated in this way for understanding purposes.

The circuit board of the apparatus of FIGS. 9-11 and 13-14 can also be programmed to allow a user to test a pressure switch in the following manner: the user presses the "on/off" button (which, when the apparatus is already in the "on" position, is programmed to act as a "hold" or "capture" button), then presses and holds the "up" arrow. The pump output increases rapidly, and the moment the switch closes, the pressure value is captured by the manometer (this is programmed into the circuit board). The user notes the reading, then presses the "hold" (i.e. "on/off") button again to release the captured reading. The user then presses the "hold" button once again, and then presses and holds the "down" arrow. The pump output decreases rapidly, and the moment the switch opens, that pressure value is also captured by the manometer. The user then notes the readings.

The circuit board can also be programmed so that the user can simply connect the apparatus to the pressure switch to be tested, press the "on/off" button (after the apparatus has already been turned "on") and the apparatus does the above automatically. Further, it can be appreciated that while the "on/off" button can be programmed to perform these functions, it would be an easy task to add separate "hold" or "capture" buttons to the apparatus in order to separately control the pressure measuring functions of the apparatus, rather than using the "on/off" button to do so.

Figure 11:
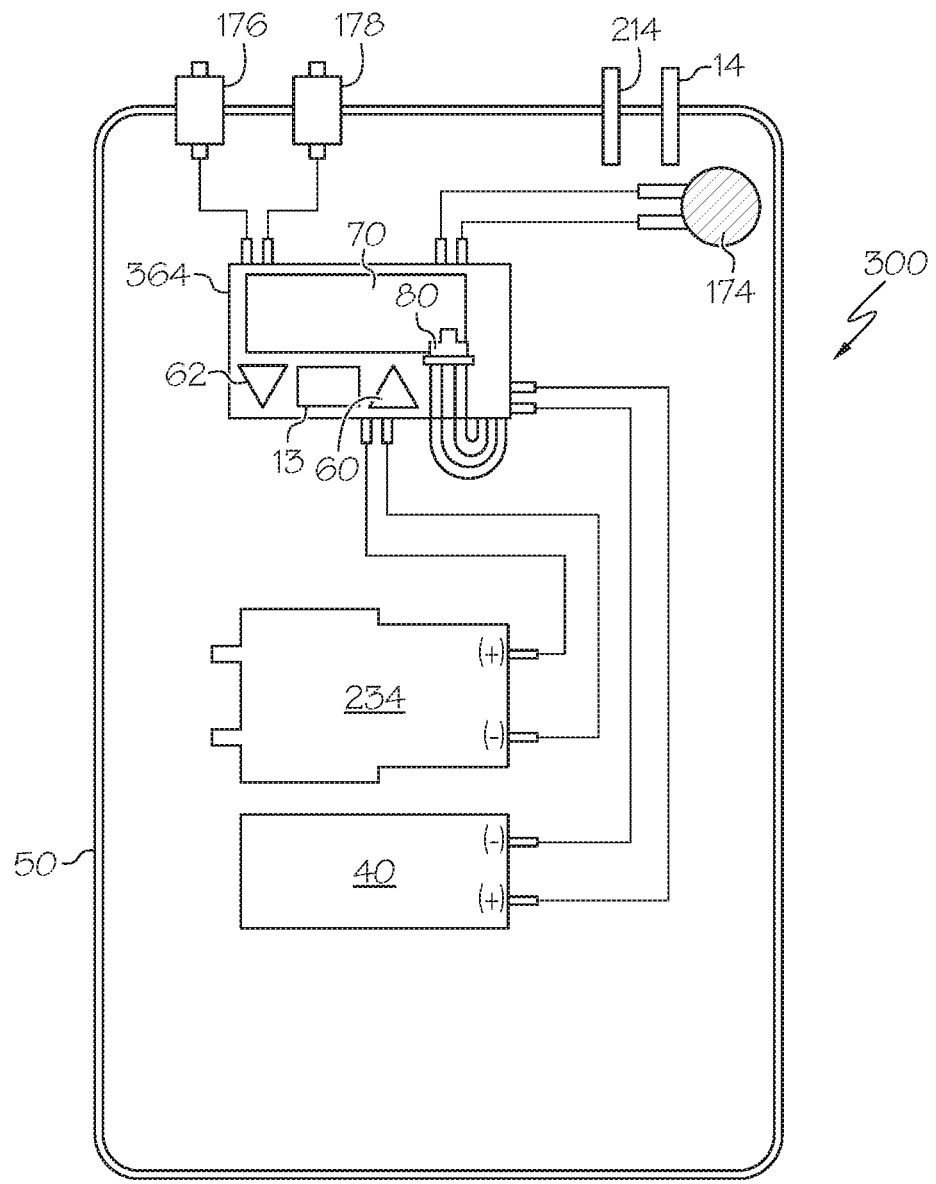
FIG. 11 is a plan view of the interior electrical circuitry of the apparatus of FIG. 9.

FIG. 11 is a plan view of the interior electrical circuitry of the apparatus 300. In use, when the on/off button 13 is placed in the "on" position, the circuit within the circuit board 364 is completed and the battery 40, the air compressor 234, the up and down buttons 60, 62, the manometer 80, manometer screen 70, and the conductivity indicator 174 (conductivity can also be displayed on the manometer screen) are operational. Turning the on/off button 13 to the "off" position will break the circuit and these portions of the apparatus 300 will turn off. Conductivity indicator lead inputs 176 and 178 are connected to the circuit board 364, which is connected to the conductivity indicator light 174 (or indicated on the manometer screen). Thus, the conductivity indicator light 174 will be activated upon completion of the circuit between lead input 176 and lead input 178. Therefore, this apparatus can be used solely as a conductivity indicator, exclusive of its ability to test pressure switches. This is true as well for the pressure measuring device. For example, if the pressure switch is a normally open switch, the conductivity indicator light 174 will illuminate if the switch is working properly. Most pressure switches with two ports on them have a "common" terminal (in the power source) a "normally open" terminal (which closes once the pressure reaches the operating setting), and a "normally closed" terminal (which opens once the pressure reaches the setting or prevents the furnace from starting if it is open). For simplicity sake the air pressure circuitry of FIG. 10 is shown separately from the electrical circuitry of FIG. 11; however, both of these circuitries are to be housed together within the apparatus 300.

The apparatus 300 of FIGS. 9-11 is used in a similar manner as explained above for the apparatus 200 of FIGS. 5-8; however, manometer screen 70 is also incorporated within the housing 50, and manometer 80 is included inside of the apparatus 300. This allows the user to conveniently calibrate and test the function of a pressure switch with a single apparatus, without having to carry or provide a separate pressure measuring device.

Figure 12:
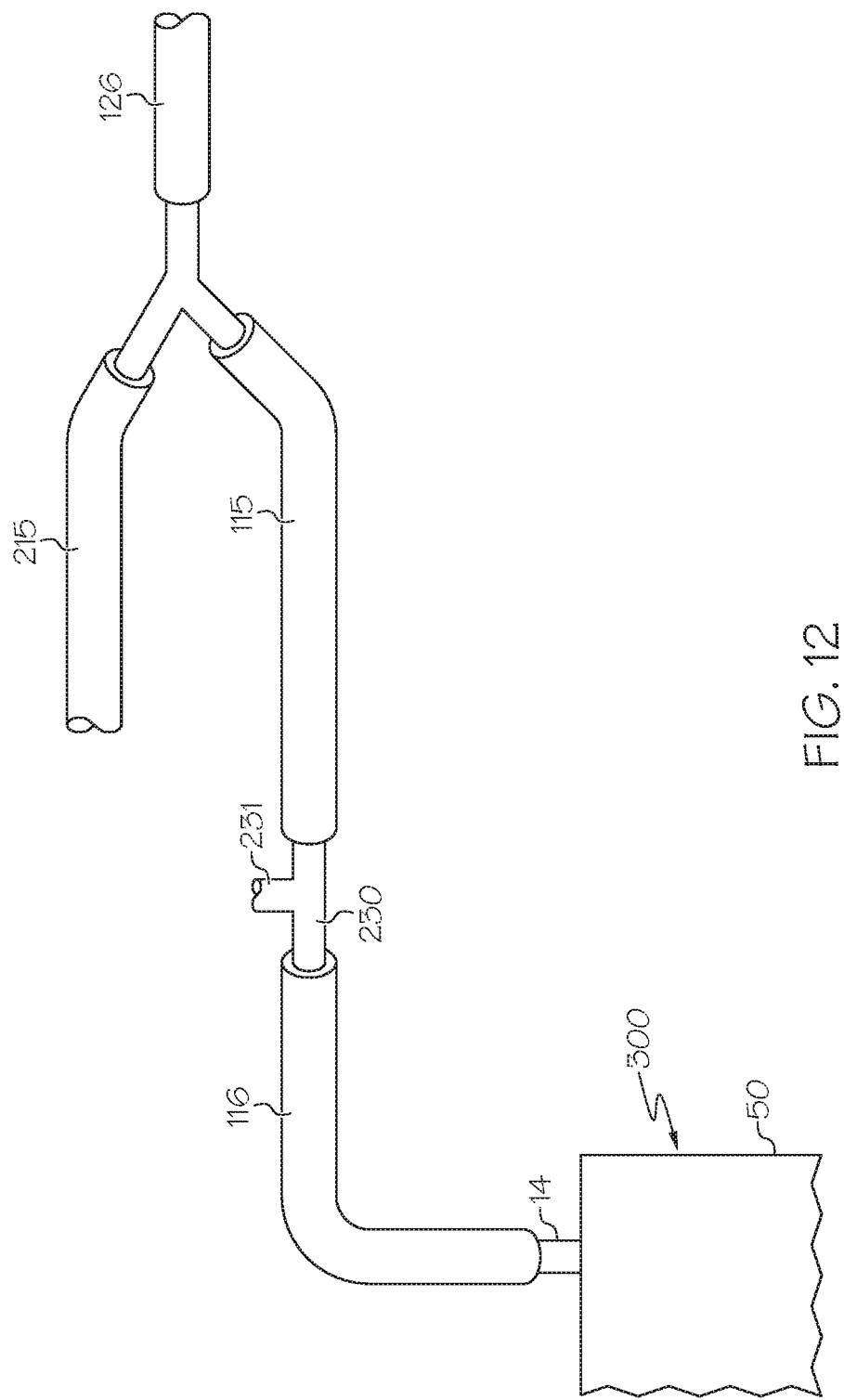
FIG. 12 is a plan view of the connection between the apparatus of FIG. 9 and the pressure switch, showing an external bleed port that can be added for achieving low pressures.

The device of the present invention is generally able to detect pressures between negative (−) 20.00 to positive (+) 20.00 inches of water, and more typically between negative (−) 10.00 and negative (−) 0.20 inches of water. However, if an external bleed port is used, pressures at negative (−) 0.01 inches of water can be measured. Also, while the upper limit of pressures measured is typically 20 inches of water for regular purposes, depending on the strength of the air compressor used in the apparatus, larger positive pressures up to 200 inches of water can also be measured using the apparatus of the invention. FIG. 12 shows a variation of the connection between the apparatus 300 of FIG. 9 and the pressure switch 22, showing an external bleed port 231 that can be added for achieving lower pressures. Tubing 116 and T-piece 230 is added between the vacuum inlet nozzle 14 and tubing 115. Opening 231 of the T-piece 230 is left open to air, which provides a bleed port for vacuum pressure to escape, and allows the user to measure pressures as low as 0.1 inches of water. The external bleed port is used to help regulate and maintain pressures from negative (−) 0.01 inches of water to positive (+) 0.20 inches of water column. It is incorporated into the device to also test pressure switches that do not have an internal bleed port.

Figure 13:
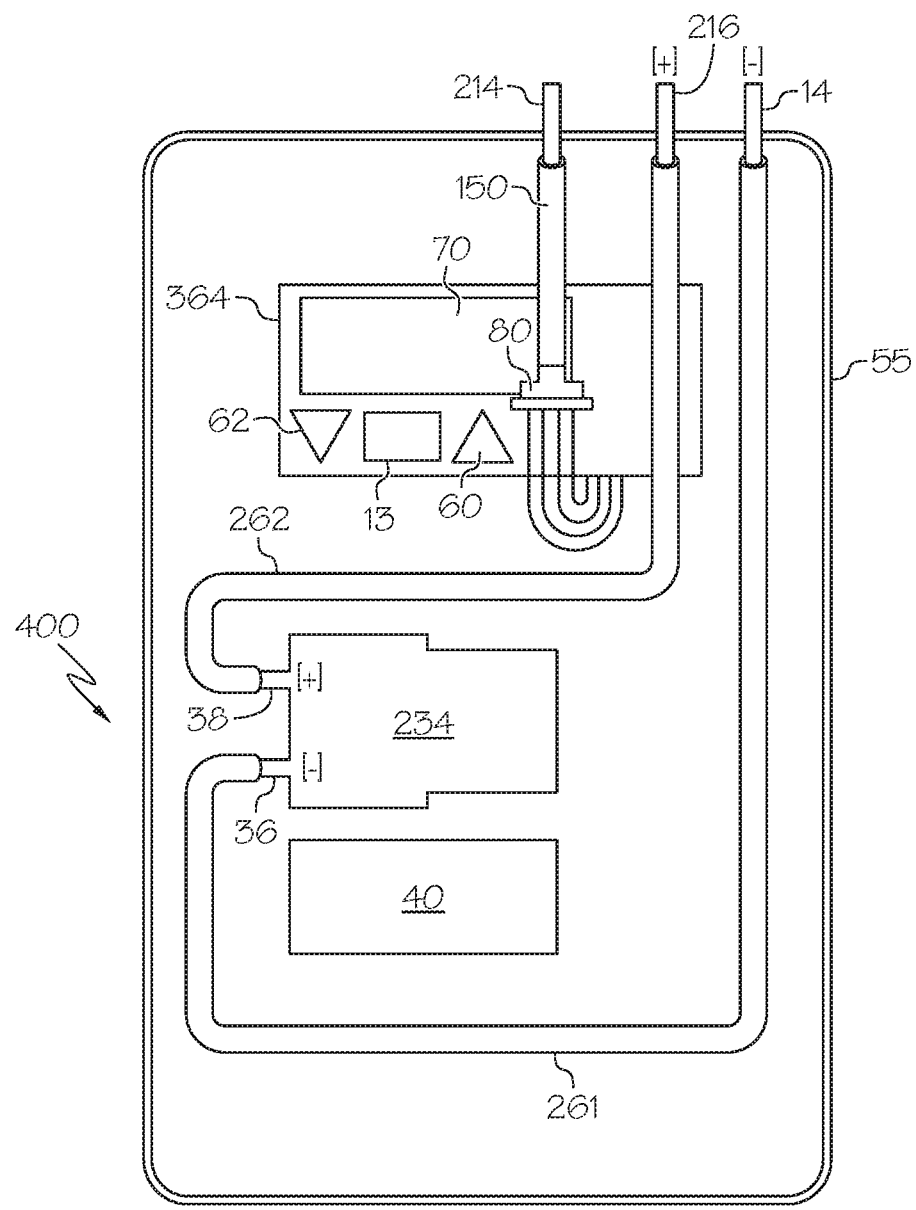
FIG. 13 is a plan view of the interior air pressure circuitry of one embodiment of a portable calibration apparatus according to the present invention.
Figure 14:
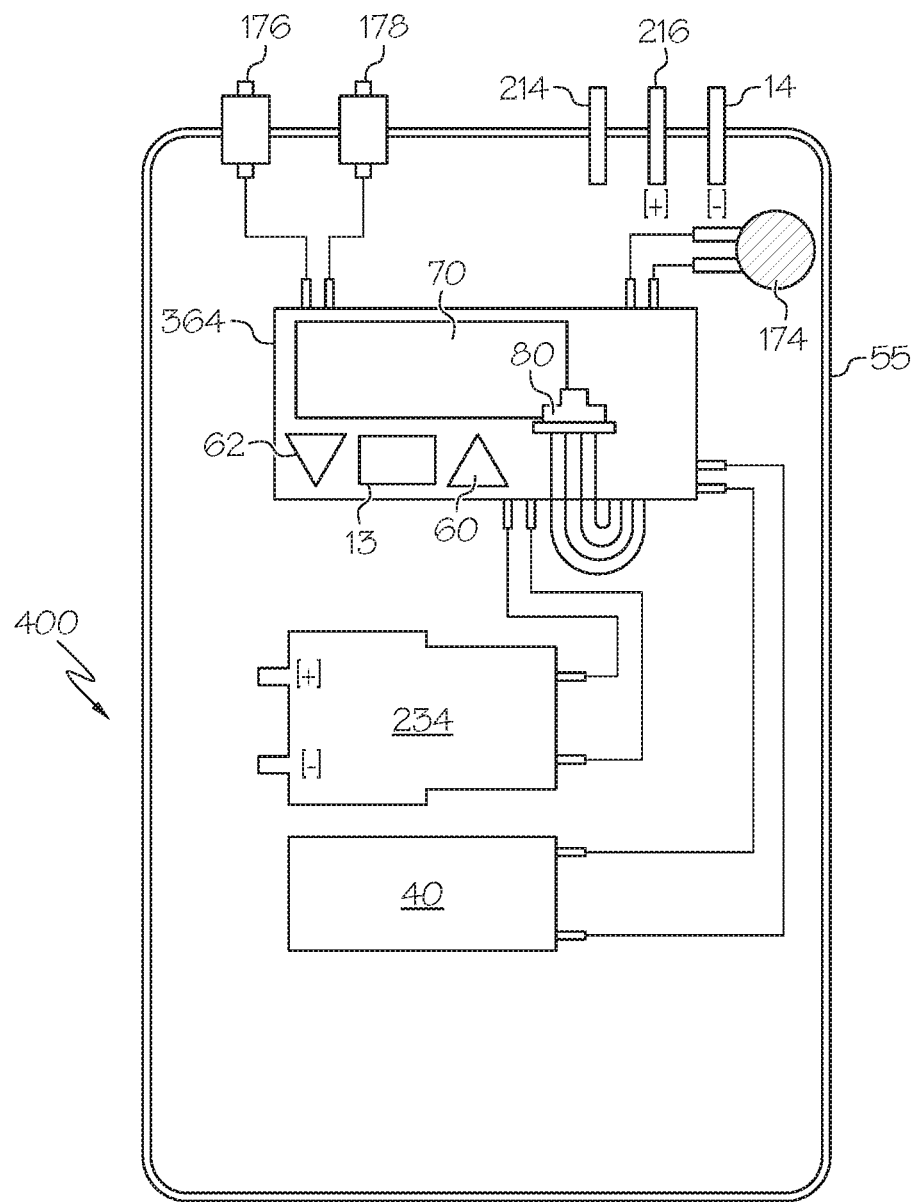
FIG. 14 is a plan view of the interior electrical circuitry of the portable calibration apparatus of FIG. 13.

With reference to FIGS. 13 and 14, another embodiment of the pressure switch calibration and diagnostic device 400 of the present invention is illustrated, which includes a pressure measuring nozzle 214 and a positive pressure outlet nozzle 216 in addition to the vacuum inlet nozzle 14 on the external surface of the housing 55, and also incorporates a manometer 80 inside the housing 55 of the calibration and diagnostic apparatus 400. Similar to the apparatus 300 in FIGS. 9-11, the apparatus 400 includes an on/off button 13 in the front face of the housing, a manometer readout screen 70, an "up" arrow or increase voltage button 60, a "down" arrow or decrease voltage button 62, a conductivity indicator light 174, and conductivity indicator lead inputs 176 and 178 on the external surface of the housing 55. While FIGS. 9-11 and 13-14 show the indicator light 174, it can be appreciated that, because of the use of a circuit board, the indicator light can be eliminated and incorporated on the readout of the manometer screen 70. The internal air pressure circuitry of the apparatus 400 includes an air compressor 234 having vacuum inlet 36 and pressure outlet 38. The vacuum inlet 36 is connected by flexible tubing 261 to the vacuum inlet nozzle 14. The pressure outlet 38 is connected by flexible tubing 262 to the positive pressure outlet nozzle 216. An internal pressure measuring device or manometer 80 connects via tubing 150 to the pressure measuring nozzle 214.

When the air compressor 234 is in the "on" position, gas or air is drawn into the vacuum-side inlet 36, which reduces the air pressure on the vacuum-side connecting means 261, and a vacuum is created and communicated via tubing 261 to the vacuum inlet nozzle 14 to pull or draw air into the nozzle. Likewise, positive pressure is created by the compressor 234 as gas or air is pumped out of the pressure outlet 38, which is communicated via tubing 262 to positive pressure outlet nozzle 216. The manometer 80 measures the pressure of the gas that is communicated through the pressure measuring nozzle 214, which is typically used to measure the pressure transmitted from a pressure switch (e.g. see FIG. 9). The pressure at the vacuum inlet nozzle 14 is regulated by increasing or decreasing the amount of voltage being sent to the compressor 234, via up and down buttons 60 and 62. Increasing the motor speed of the compressor in this manner enables the compressor 234 to achieve maximum or minimum vacuum exerted at the vacuum inlet nozzle 14. Thus, the degree of mass air flow entering the vacuum inlet nozzle 14, as well as the degree of mass air flow exiting positive pressure outlet nozzle 216 is regulated by adjusting the up and down buttons 60, 62. Adjusting the compressor motor speed in this manner can typically be done with one hand by the user.

As shown in FIG. 14, a circuit board 364 receives input from the on/off button 13 and the up and down arrows 60, 62, and also connects to (and thus provides power to, via the battery 40) the manometer screen 70, the conductivity indicator 174, and internal manometer 80. Although the manometer 80 is shown in front of the manometer screen 70 in FIGS. 13 and 14, it can be appreciated that the manometer 80 is typically placed behind the screen 70, and is illustrated in this way for understanding purposes.

In use, when the on/off button 13 is placed in the "on" position, the circuit within the circuit board 364 is completed and the battery 40, the air compressor 234, the up and down buttons 60, 62, the manometer 80, manometer screen 70, and the conductivity indicator 174 are operational. Turning the on/off button 13 to the "off" position will break the circuit and these portions of the apparatus 300 will turn off. Conductivity indicator lead inputs 176 and 178 are connected to the circuit board 364, which is connected to the conductivity indicator light 174. Thus, the conductivity indicator light 174 will be activated upon completion of the circuit between lead input 176 and lead input 178. Therefore, this apparatus can be used solely as a conductivity indicator, exclusive of its ability to test pressure switches. This is true as well for the pressure measuring device.

The embodiments shown in FIGS. 9-12 and FIGS. 13-14 can also include a second internal pressure measuring device or manometer (not shown), similar to manometer 80. The second manometer can connect via tubing to a second pressure measuring nozzle (similar to nozzle 214) on the external surface of the housing of the apparatus, exiting next to pressure measuring nozzle 214. This port could also be used to measure positive or negative gas pressure. The second pressure measuring device is in fluid communication with the second pressure measuring nozzle, and in electrical communication with the circuit board 364 and the pressure readout screen 70. Dual pressure switches are also used to set the gas pressure of the gas valve in high efficiency units. When the gas ignites there is a slight variance in the pressures measured by a manometer. The gas pressure is then adjusted to the manufacturer's specifications.

In the embodiments shown in FIGS. 5-14, the battery 40 is typically either a single 9 Volt battery or two size AA batteries, but can be any type of device that can store and provide electrical power to the apparatus. Also, it is to be noted that the apparatus is not limited to using a single battery; the manometer 80 and the air compressor 234 can be wired to run off of separate batteries as well.

The portable calibration apparatus of the present invention is typically able to diagnose problems with any manufacturer's HVAC pressure switch, and will also be able to calibrate any adjustable pressure switch. Adjustable pressure switches typically include both a pressure port and a vacuum port and can be used in place of the manufacturer's pressure switch, should a service technician not have an exact replacement switch at the worksite. Further, the apparatus can be used to diagnose problems with pressure signal transducers. A signal transducer is like an electronic version of the pressure switch. In the newer furnaces signal transducers are used with or used in conjunction with a pressure switch. Similar to the pressure switch, it completes or opens a circuit if the pressure is incorrect. Pressure is measured electronically, eliminating the need for a mechanical device. A more precise measurement is thus able to be measured by signal transducers.

The various embodiments of the portable calibration apparatus disclosed herein are typically intended to be light in weight and small enough to fit in one hand of the technician, to be carried from one work site to the next in a pocket or small carrying bag. Early detection of pressure switch failure while the pressure switch is incorporated into an HVAC system has previously not been this easy to perform. The various embodiments of the apparatus of the present invention can potentially decrease the number of return visits currently made by HVAC service technicians, reduce overtime costs, and will likely prevent property damage caused by incorrect pressure switch settings and/or previously unrecognized pressure switch failure. The pocket sized apparatus is conveniently held and operated by one hand, making it extremely suitable for HVAC service technicians. A technician will no longer have to carry large calibrating devices to the worksite, or alternatively be resigned to replacing a properly functioning pressure switch because proper testing equipment is not available.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. Accordingly, departures may be made from such details without departing from the scope of the invention.

What is claimed is:

1. An apparatus for calibrating and testing a pressure switch, the apparatus comprising:
    a) a housing including an inside and an external surface;
    b) an air compressor located on the inside of the housing, the air compressor including a vacuum-side inlet and a pressure-side outlet;
    c) a first vacuum inlet nozzle in fluid communication with the vacuum-side inlet of the air compressor, the first vacuum inlet nozzle being located on the external surface of the housing;
    d) a second vacuum inlet nozzle in fluid communication with the vacuum-side inlet of the air compressor, the second vacuum inlet nozzle being located in the external surface of the housing;
    e) a positive pressure outlet nozzle in fluid communication with the pressure-side outlet of the air compressor, wherein the positive pressure outlet nozzle is located inside the housing of the apparatus;

f) a circuit board located on the inside of the housing;
g) a battery located on the inside of the housing for supplying power to the circuit board;
h) an increase voltage button located on the external surface of the housing and in electrical communication with the circuit board, wherein activating the increase voltage button will cause the circuit board to increase the voltage supplied to the compressor;
i) a decrease voltage button located on the external surface of the housing and in electrical communication with the circuit board, wherein activating the decrease voltage button will cause the circuit board to decrease the voltage supplied to the compressor;
j) a pair of conductivity indicator lead inputs located on the external surface of the housing and in electrical communication with the circuit board;
k) a conductivity indicator light located on the external surface of the housing and in electrical communication with the circuit board, wherein the conductivity indicator light is operable to visually indicate whether the pressure switch is open or closed; and
l) an on/off button located on the external surface of the housing for completing an electrical circuit between the battery and the circuit board, wherein when the on/off button is placed in the "on" position, the circuit is completed and the battery, the air compressor, the increase and decrease voltage buttons, and the conductivity indicator light are operational.

* * * * *